Jan. 15, 1935. J. H. HUNT 1,987,682
SYNCHRONIZING CLUTCH MECHANISM FOR VEHICLE CHANGE SPEED TRANSMISSION
Filed Feb. 23, 1932

Inventor
John H. Hunt
By Blackmore, Spencer & Flint
Attorneys

Patented Jan. 15, 1935

1,987,682

UNITED STATES PATENT OFFICE 1,987,682

SYNCHRONIZING CLUTCH MECHANISM FOR VEHICLE CHANGE SPEED TRANSMISSION

John H. Hunt, Detroit, Mich., assignor to General Motors Corporation, Detroit, Mich., a corporation of Delaware Application February 23, 1932, Serial No. 594,505

7 Claims. (Cl. 192—53)

This invention relates to change speed mechanism for use on vehicles, and more particularly to such a mechanism employing sequentially operating friction and jaw clutches, together with energizing mechanism for the friction clutch.

The primary object of the invention is to facilitate the operation of the clutching mechanism.

Another and more specific object is to provide means for positively disconnecting the friction clutch prior to the engagement of the teeth constituting the jaw clutch, whereby the friction clutch may not interfere with the engagement of the teeth of the jaw clutch.

Other objects and advantages will appear from the following description.

In the drawing accompanying this description—

Figures 1, 2, 3:
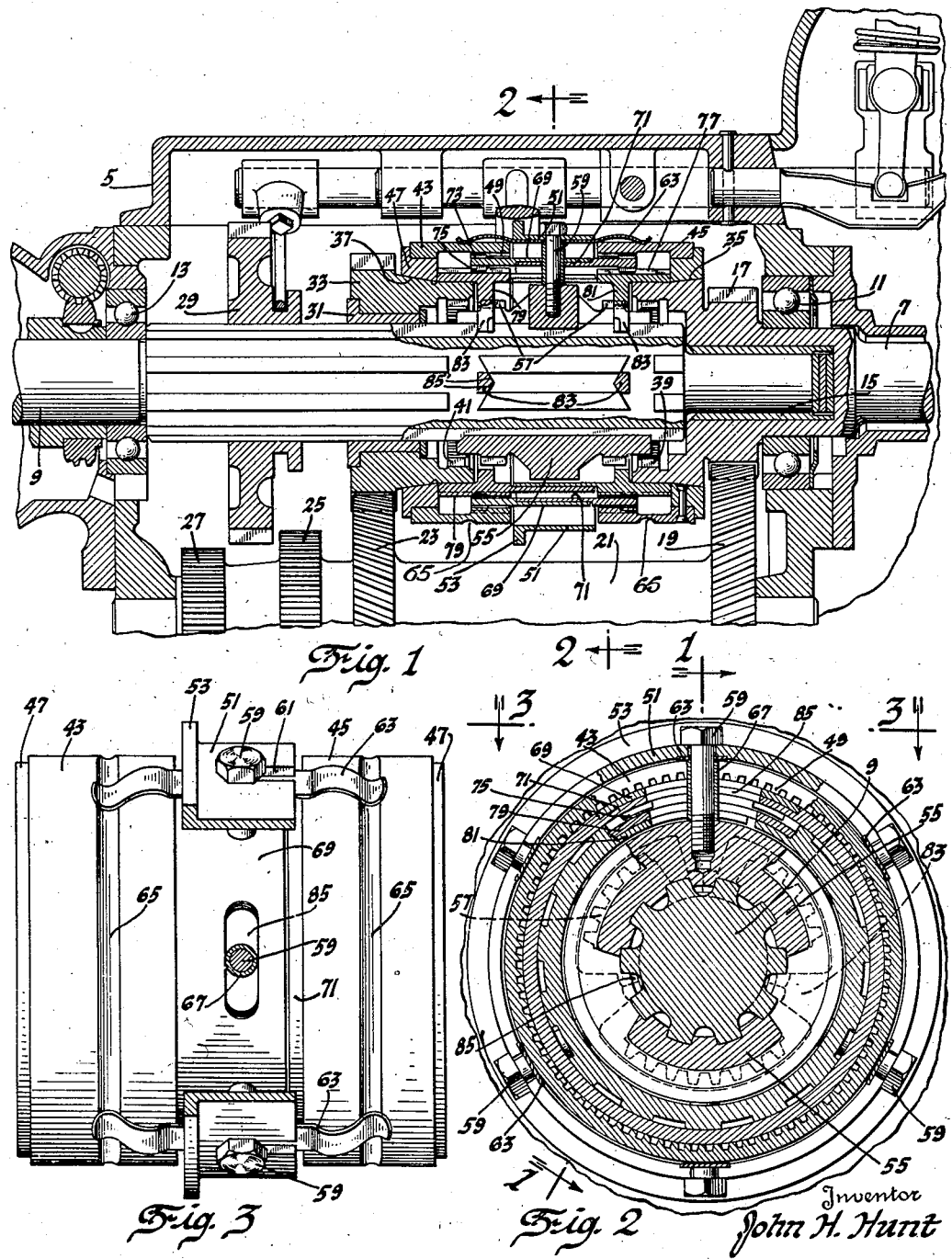
Fig. 1 is a longitudinal section through a change speed transmission, the section corresponding to line 1—1 of Fig. 2.
Fig. 2 is a section on line 2—2 of Fig. 1 partly broken away.
Fig. 3 is a plan view, partly in section.

Referring by reference characters to the drawing, numeral 5 represents the transmission housing and 7 is the input shaft which is being rotated by the engine of the motor vehicle through the clutch, these parts being conventional and not shown. The output or spline shaft is represented by numeral 9. The input shaft is journaled by bearings 11 at the front end of the transmission and the output shaft by bearings 13 at the rear end of the transmission. The front end of the output shaft may be piloted into the recessed end of the input shaft 7 and rotatably supported by the bearings 15.

Numeral 17 represents the driving gear of the conventional constant mesh train of which the driven gear is represented by numeral 19. This driven gear 19 is carried by the countershaft 21. The countershaft is also provided with gears 23, 25, and 27, gear 23 being the second speed driving gear, gear 25 being the low speed driving gear, and gear 27 being the reverse driving gear.

Slidable on the spline shaft 9 is a gear 29 which may be moved into mesh with gear 25 for low speed driving or into mesh with a reverse idler, not shown, which is constantly rotated by gear 27.

On the spline shaft 9 is a sleeve 31 rotatably supporting the second speed driven gear 33. Numerals 35 and 37 represent conical friction faces rigidly associated with the gears 17 and 33 respectively. In a similar way internal clutch teeth 39 and 41 are located radially within the conical friction surfaces aforesaid. Numerals 43 and 45 represent two friction clutch sleeves having at their remote ends conical friction faces 47 for engagement with the conical friction faces associated with the gears 17 and 33. On the adjacent end of the friction clutch sleeves 43 and 45 are internal teeth 49. These teeth extend but a comparatively short distance inward from the ends of these sleeves. Numeral 51 represents a ring member between the sleeves 43 and 45 having a slightly greater diameter than the sleeves. It is provided with a radial flange 53 by which it may be reciprocated through the instrumentality of a suitable fork in the conventional way.

A double jaw clutch member 55 is slidable and non-rotatable on the spline shaft 9 and is located between the gears 17 and 33. It has segmental portions as shown. This slidable jaw clutch member has teeth 57 on its segmental portions, these teeth being designed to engage teeth 39 and 41 for the purpose of making jaw clutch engagement with the driving shaft 7 or with the second speed driven gear 33. Numeral 59 represents threaded bolts which extend radially from the slidable jaw clutch member 55 and through slots 61 in the member 51. Numeral 63 represents flat springs which are held by the bolts 59 and under the ring 51. The ends of these springs engage grooves 65 in the friction clutch sleeves 43 and 45. By this construction the reciprocation of the movable jaw clutch member 55 similarly moves the two sleeves 43 and 45. Numeral 67 represents spacing sleeves surrounding the bolts and positioned between the springs 63 and a suitable abutment on the sliding jaw clutch member. Numerals 69 and 71 are used to designate two rings which at their mid portion are reduced in thickness and overlap as shown in Fig. 1. The ends of these rings are thickened and have external teeth 73 and internal teeth 75. The teeth 73 slide into and out of engagement with the teeth 49 of the ring 43. Teeth 75 are in constant mesh with the external teeth 77 upon the energizing rings 79 and 81. These energizing rings are rotatably supported on the cylindrical ends of the flanges associated with the gears 17 and 33. The remote ends of the energizing rings engage the conical friction members 47 as shown in Fig. 1. The energizing rings are also provided with inwardly directed radial fingers 83 which extend between the toothed segmental portions of the movable jaw clutch member. The extreme inner ends of the radial fingers 83 are bevelled as at 85' to cooperate with similar bevelled faces on the splines of the spline shaft 9 as best shown in Fig. 1. The bolts with their surrounding sleeves 67 pass through circumferential openings 85 in the overlapping rings 69 and 71. The energizing rings are also provided with overlapping portions, and in these overlapping portions are openings extending both axially and circumferentially as will be seen from a comparison of Fig. 1 and Fig. 2.

The operation of the device is substantially as follows: When the movable jaw clutch member 55 slides axially, to the left for example, the springs 63 carry the sleeves 43 and 45, sleeve 45 effecting the separation of its conical friction member from the conical friction surface 35. Simultaneously the friction cone 47 associated with ring 43 engages the conical surface 37 of the gear 33. As a result of the contact with these conical faces and the torque produced by the relative rotation of gear 33 and the ring 43, the latter is then rotated relative to the clutch member 55, the slots 85 permitting such relative rotation. The rotary motion of sleeve 43 is communicated to the energizing ring 79 by means of the ring 69 which, as explained above, is in toothed engagement with both the friction ring 43 and with the energizing ring 79. The rotation of sleeve 79 relative to the sliding clutch member 55 and to the shaft 9 causes an axial movement of ring 79 owing to its cam engagement with the shaft at 85'. This axial movement is converted into a force pushing the conical friction member 47 firmly upon the friction cone 37 associated with gear 33. When synchronization has been effected the further movement of the clutch member 55 not only engages the teeth 57 and 41 but, before doing so, and by the act of releasing teeth 73 from teeth 49 (it being obvious that sleeve 69 moves axially with the jaw clutch member) the friction clutch element 43 is disconnected from the ring 69 and from the energizing ring and is free to rotate together with gear 33. The gear 33 may then be slightly rotated as the clutch teeth engage in the event that these teeth are out of engaging alignment. When the jaw clutch elements are disengaged teeth 73 will again engage teeth 49 to couple friction clutch element 43 to the shaft.

There is thus provided a combined friction and jaw clutch having provision for energization of the former and also provision for releasing the friction clutch after it has performed its function and before the jaw teeth engage.

I claim:
1. In combination, a shaft and a member mounted for rotation relative to said shaft, sequentially-acting friction and jaw clutches to couple said shaft and member, first means to effect such sequential action, servo mechanism actuated by the first means to energize said friction clutch, said servo mechanism including a part rigid with said shaft, and second means actuated by the first means to positively uncouple said friction clutch from said shaft prior to the engagement of the jaw clutch.

2. In combination, sequentially-acting friction and jaw clutches, one element of each being movable, resilient means whereby the initial movement of the movable jaw clutch element effects the engagement of the friction clutch elements, interengaging teeth between the movable jaw clutch element and the movable friction clutch element, slidable means moved by the movement of the movable jaw clutch element to release said toothed connection prior to the engagement of the elements of the jaw clutch.

3. The invention defined by claim 2 together with an energizing member for the friction clutch and a permanent toothed connection between said energizing member and said slidable means.

4. The invention defined by claim 2 together with an energizing member for the friction clutch and a permanent toothed connection between the energizing member and the slidable means, a spline shaft, said movable jaw clutch member being slidable on the spline shaft, said energizing member having cooperating angular faces with similar faces on the splines of said shaft, and said energizing member having a contact engagement with said movable friction clutch element.

5. In combination, sequentially acting friction and jaw clutches, each clutch including a fixed and a movable element, first means to simultaneously move both movable clutch elements, servo mechanism actuated by said frictional clutch to further energize said clutch, and second means moved by said movable jaw clutch element independently of said movable friction clutch element to separate said first means from said movable friction clutch element prior to the engagement of the movable element of the jaw clutch with the fixed element thereof.

6. An axially fixed power-transmitting element, a friction clutch element and a jaw clutch element associated therewith, an axially movable power-transmitting element, a friction clutch element and a jaw clutch element associated therewith, means to cause the friction clutch elements to be forced together as a result of relative rotation when said friction clutch elements are in contact, means to move said movable clutch elements to and from said cooperating elements, said means being adapted to cause said friction clutch elements to engage before said jaw clutch elements, and means to release one friction clutch element from its power-transmitting element prior to engagement of said jaw clutch element, said means causing reengagement of said friction clutch element with its power-transmitting element upon disengagement of the said jaw clutch elements.

7. An axially fixed power-transmitting element, a friction clutch element and a jaw clutch element associated therewith, an axially movable power-transmitting element, a friction clutch element and a jaw clutch element associated therewith, means to move said movable clutch elements to and from said cooperating elements, said means being adapted to cause said friction clutch elements to engage before said jaw clutch elements, and means to release one friction clutch element from its power-transmitting element prior to engagement of said jaw clutch element, said means causing reengagement of said friction clutch element with its power-transmitting element upon disengagement of the said jaw clutch elements.

JOHN H. HUNT.